July 28, 1936.  F. L. MAIN ET AL  2,049,215
WHEEL
Filed May 31, 1932
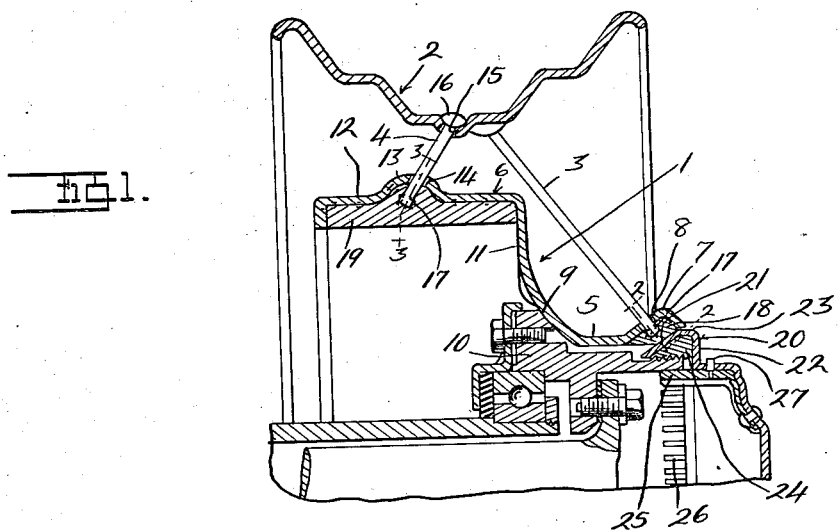
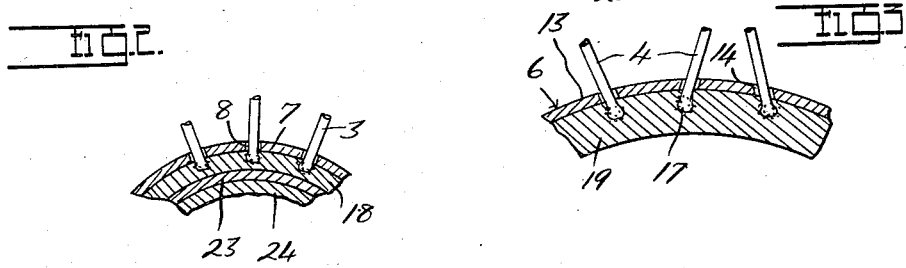
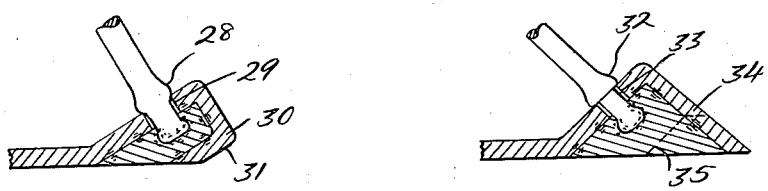
Inventors
Frank L. Main
George E. Moore Patented July 28, 1936

2,049,215

UNITED STATES PATENT OFFICE 2,049,215

WHEEL

Frank L. Main, Birmingham, and George E. Moore, Dearborn, Mich., assignors, by mesne assignments, to The Kelsey-Hayes Wheel Company, Detroit, Mich., a corporation of Delaware Application May 31, 1932, Serial No. 614,574

1 Claim. (Cl. 301—6)

The invention relates to wheels and refers more particularly to spoked wheels for motor vehicles. One of the objects of the invention is to provide a spoked wheel which is simple in construction and at the same time sufficiently strong to withstand the stresses to which it is subject in use. Other objects are to provide an improved means for connecting the spokes to the hub and rim members; to so construct the brake drum that it has an annular brake engaging member cast upon the spokes and adapted to connect the spokes to one of the hub and rim members; and to provide an improved composite thrust element. Further objects are to so form the wheel that the spokes are effectively connected to one of the hub and rim members and to so form the wheel that the spokes are also tensioned while being connected.

These and other objects of the invention will become apparent from the following description, taken in connection with the accompanying drawing, in which—

Figure 1 is a transverse section through a wheel showing an embodiment of my invention;

Figures 2 and 3 are cross sections on the line 2—2 and 3—3 respectively of Figure 1;

Figures 4 and 5 are sectional views illustrating modifications.

The wheel embodying my invention is a spoked motor vehicle wheel having the hub and rim members 1 and 2, respectively, and the inter-connecting front and rear rows of spokes 3 and 4, respectively. The hub member is formed of sheet metal and preferably sheet steel and has the hub barrel 5 and the integral brake drum body 6. The hub barrel is enlarged at its front end and has the annular channel portion 7 formed with the holes 8 through which the inner end portions of the front row of wire spokes 3 extend. The hub barrel is also enlarged at its rear end and is provided with the flared seat 9 for engaging a correspondingly flared seat upon the inner hub 10. The brake drum body has the back 11 which extends radially and connects into the flared rear end portion of the hub barrel and also has the transverse annular flange 12 which is preferably reinforced intermediate its edges by the annular hollow rib 13. This rib is provided with the holes 14 through which pass the inner end portions of the rear row of wire spokes 4.

The rim member 2 is also preferably formed of sheet metal, such as sheet steel, and is preferably of the drop-center type. The base of its well is preferably bossed inwardly toward the axis of the rim member and these bosses have the holes 15 through which pass the outer end portions of both the front and rear rows of spokes. The spokes of both of these rows have the heads 16 at their outer ends which are adapted to seat within the concavities formed by the bosses in the rim member. These spokes are also preferably provided with the enlargements 17 at their inner ends, the holes 8 and 14 being of a size to permit these enlargements to pass therethrough during assembly.

18 is a cast annulus within the channel portion 7 of the hub barrel and imbedding the inner end portions of the front row of spokes 3. 19 is a second cast annulus within the annular flange 12 of the brake drum body and imbedding the inner end portions of the rear row of spokes 4. Both of these annuli are preferably cast iron and furthermore are formed by centrifugally casting the same within the hub member while the portions of this hub member which contact with these castings are at a sufficiently high temperature to insure fusing of the castings to the portions. The inner end portions of both rows of spokes are also fused to the castings, so that as a result the spokes are effectively connected to the hub member and at the same time they are tensioned by reason of the shrinking of the adjacent portions of the hub member upon cooling thereof after the casting operation. The annulus 19 forms the brake engaging lining of the brake drum.

The annulus 18 is also adapted to cooperate with the nut 20 in detachably securing the wheel to the inner hub and, as shown in Figure 1, this annulus has the forwardly and outwardly bevelled inner bearing face 21 for engaging a correspondingly tapered outer bearing face of the nut 20. This nut is formed of the sheet metal member 22 having the annular channel portion 23 provided with the bevelled outer bearing face and is also formed of the cast annulus 24 within the channel portion and internally threaded to engage the front end portion of the inner hub 10. The annulus 24 is preferably centrifugally cast within and fused to the channel portion of the nut when the latter has been heated to a predetermined temperature such that fusing is assured.

For locking the nut to the inner hub, bevelled bearing faces may be provided with cooperating corrugations. Also, if desired, the resilient finger 25 may be provided within and secured to the nut and having its free end portion alternatively engageable in one of the series of notches 26 formed interiorly in the front end of the inner hub. This resilient finger may be pressed inwardly to become disengaged from one of the notches by means of the pin or plunger 27 which extends radially outwardly through the nut and is engageable by a nut wrench when being applied to the nut to force the finger inwardly.

In the modification shown in Figure 4, the spokes are provided with the rounded enlargements 28, which are so positioned that when the adjacent portions of the hub member have been heated to the desired extent and expanded these enlargements fill the spoke holes 29 in the hub member and prevent any molten metal from flowing out through these holes during the centrifugal casting of the annuli within the hub member. Furthermore, as shown in this figure, the front end of the hub member has the return-bent portion 30 providing the forwardly and outwardly tapered bearing face 31 for engaging the nut.

Figure 5 discloses another modification in which the inner end portions of the spokes are provided with the enlargements 32 forming the annular transverse shoulders 33 for abutting the outer face of the hub member and more particularly its portions surrounding the spoke holes when this hub member is heated and expanded. Also, as shown in this figure, the front end of the hub member has the inwardly and forwardly inclined flange 34 which, during the centrifugal casting operation functions to retain the molten metal and which, after the forming of the annulus, is machined off, as is also the annulus, along the dotted line 35, to form the forwardly and outwardly bevelled bearing face for engaging the nut.

In forming the wheel, the hub member 1 and the rim member 2 are concentrically positioned upon a revoluble fixture with the hub member within the rim member. The front and rear rows of wire spokes 3 and 4 are then threaded successively through the proper holes in the rim member and the hub member and these spokes are forced inwardly by suitable means, such as plungers, upon the fixture to firmly hold the spoke heads 16 against their respective seats in the rim member. At this time the inner and slightly enlarged end portions 17 of the spokes are located within the hub member and clear the same. The annular flange 12 and the annular channel portion 7 of the hub member are then heated to a predetermined temperature and the fixture with the hub member and spokes is rotated and when revolving at a predetermined R. P. M. molten metal at a predetermined temperature is poured into both the annular flange and the annular channel portion and around the spoke inner end portions, this metal fusing with the metal of the hub member and of the spokes with which it contacts. The rotation continues for a sufficient length of time to permit the cooling of the annuli and the portions of the hub member with which they contact, after which the wheel may be removed from the fixture. During the cooling, the annuli more tightly grip the inner end portions of the spokes and these annuli and the encircling portions of the hub member contract or shrink to tension the spokes. After the wheel is removed from the fixture the necessary machining operations may be carried out to complete the wheel, such machining operations including the machining of the annulus within the annular flange of the brake drum body and the annulus and also the front inturned flange at the front end of the hub member.

What we claim as our invention is:

In a wheel, hub and rim members, a spoke having one end connected to one of said members and having an enlarged portion at the opposite end extending through an opening in the other of said members of sufficient diameter to freely receive the enlarged portion, said spoke having another enlarged portion exteriorly of the latter member and of sufficient dimension to close the hole through this member, and a casting within the last named member imbedding the portions of the spokes extending through this member for connecting the spokes thereto.

FRANK L. MAIN.
GEORGE E. MOORE.